ion with each other at their outer faces when the coupling elements are connected, the outer faces being frusto-conical and surrounding a bore through the gasket. The gaskets at their inner ends have an initial clearance with the coupling elements to permit axial deflection of the gaskets whereby during axial connecting movement of the two elements the frusto-conical outer faces swing into a planar position with a minimum of mass deformation during a major part of the connecting movement and with the gasket inner ends engaging walls of the coupling elements near the completion of the connecting movement whereby sufficient mass deformation of the gaskets occurs to increase the sealing contact between the gaskets and to ensure adequate resistance to disconnect movement of the elements.

United States Patent [19]
Kershaw

[11] 3,758,137
[45] Sept. 11, 1973

[54] QUICK DISCONNECT COUPLING
[75] Inventor: Sydney L. Kershaw, South Euclid, Ohio
[73] Assignee: Parker-Hannifin Corporation, Cleveland, Ohio
[22] Filed: Nov. 3, 1971
[21] Appl. No.: 195,096

[52] U.S. Cl..................... 285/70, 285/352, 285/379
[51] Int. Cl.............................................. B60d 1/08
[58] Field of Search..................... 285/70, 35 L, 99, 285/336, 379, 380, DIG. 11, 70, 71, 72, 73, 74, 75, 76, 77, 78, 79, 65, 66, 67, 68, 69, 349, 350

[56] References Cited
UNITED STATES PATENTS
489,107 1/1893 Storz.............................. 285/352 X
1,808,382 6/1931 Stauffer........................... 285/72 X
2,250,199 7/1941 Kelly..................................... 285/99
3,498,641 3/1970 Bohlen............................ 285/352 X FOREIGN PATENTS OR APPLICATIONS
73,235 5/1944 Czechoslovakia.................... 285/71

Primary Examiner—Dave W. Arola
Attorney—John N. Wolfram

[57] ABSTRACT
A quick coupling comprising a pair of coupling elements adapted to be connected to each other, each element having a deformable gasket retained at an end thereof for sealing engagement with each other at their outer faces when the coupling elements are connected, the outer faces being frusto-conical and surrounding a bore through the gasket. The gaskets at their inner ends have an initial clearance with the coupling elements to permit axial deflection of the gaskets whereby during axial connecting movement of the two elements the frusto-conical outer faces swing into a planar position with a minimum of mass deformation during a major part of the connecting movement and with the gasket inner ends engaging walls of the coupling elements near the completion of the connecting movement whereby sufficient mass deformation of the gaskets occurs to increase the sealing contact between the gaskets and to ensure adequate resistance to disconnect movement of the elements.

6 Claims, 3 Drawing Figures

PATENTED SEP 11 1973  3,758,137

QUICK DISCONNECT COUPLING

BACKGROUND OF THE INVENTION

This invention is an improvement in the type of coupling shown in U.S. letters Pat. No. 3,498,641 wherein two coupling elements each have lugs and recesses for coupling the elements to each other and each has a deformable gasket mounted at an end thereof, the gaskets being engageable with each other for sealing the joint between the coupling elements when the latter are connected. Each gasket is retained on an inturned flange of the coupling elements and its inner end is initially closely adjacent a transverse shoulder axially spaced from the flange. The outer faces of the gaskets have initial planar contact over substantial area that results in rapid buildup of coupling force with relatively little axial connecting movement of the coupling elements. The coupling force quickly becomes accentuated upon contact of the gasket inner ends with the shoulders. Moreover, because the coupling elements are of cast metal there can be substantial variation in the dimensions of the lugs and recesses with the additional result that the coupling force may be either excessive for manual connection of the parts or it may be insufficient for obtaining sealing contact between the gaskets.

BRIEF DESCRIPTION OF THE INVENTION

The present invention overcomes the above mentioned difficulties with the prior device in that each gasket has a frusto-conical outer face so that initial engagement between two gaskets is substantially circular line contact adjacent the bore through the gasket. Such line contact spreads to nearly full face contact upon completion of coupling. During coupling, the gasket material undergoes both deflection and deformation of its mass as the frusto-conical surfaces are forced into planar contact with each other. When the parts are fully connected, the contact pressure between the gasket is greatest in the region of the initial circular line contact and gradually decreases toward the outer diameter for efficient sealing with minimum total contact force.

The conical outer faces of the gaskets permit attainment of sufficient sealing contact therebetween with a relatively large variation in the axial connecting movement whereby dimensional variations in the locking lugs and recesses on the coupling elements have relatively little effect on the coupling force and on the effectiveness of the seal.

Moreover, each gasket has a substantial initial clearance between its inner end and the shoulder of the coupling element so that the gasket may deflect inwardly without interference from the shoulder during a major part of the axial connecting movement following initial contact of the gaskets. The gasket inner end contacts the shoulder during the final portion of the connecting movement to provide significant but not excessive resistance to such final movement for ensuring sufficient sealing contact between the gaskets and to prevent accidental uncoupling of the elements.

DESCRIPTION OF THE INVENTION

Figure 1:
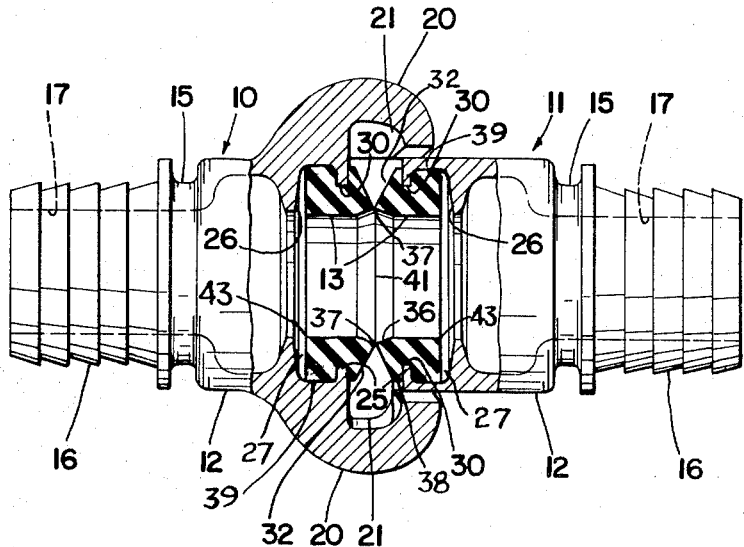
FIG. 1 is a view, partly in cross section of two coupling elements about to be connected and with the gaskets shown in their initial undeformed condition.

The complete device includes a pair of identical coupling elements 10, 11. Each coupling element includes identical one piece metallic bodies 12 and a gasket 13 of synthetic rubber or other elastomeric or resilient and deformable material. Bodies 12 at their outer ends have tubular extensions 15 that may have a series of barbs 16 formed thereon for connection to a rubber hose, and each body 12 has a fluid passage 17 therethrough.

At its inner end each body 12 has a pair of projections 20 with recesses 21 formed therein to receive partial flanges or lugs 22 of the other body member in interlocking engagement for connecting the two coupling elements 10, 11 to each other. Each lug 22 has an axially projecting nub 28 that interlocks with an axial projection 29 in recess 21 to prevent inadvertent rotary disconnect motion of the coupling halves. Between lugs 22 each coupling element has circular portions 23, 24.

Each body 12 at its inner end has an inturned annular flange 25 and axially spaced therefrom is an annular transverse shoulder 26 so as to form an enlarged recess 27 between flange 25 and shoulder 26.

Each gasket 13 has an annular groove 30 and has a frusto-conical outer end face 32 that makes an angle of about 30° with a transverse plane. Each gasket 13 has a central bore 35 that is outwardly flared at about a 15° angle at its outer end as indicated at 36, and meeting frusto-conical face 32 at a relatively sharp corner 37. Each gasket has a short cylindrical peripheral portion 38 adjacent the outer face 32 and has an inner cylindrical portion 39 with a transverse end face 40 that has an initial substantial axial clearance 42 with shoulder 26 and meets bore 35 at a corner 43. Clearance 42 is preferably about one-fourth the distance from flange 25 to shoulder 26.

Figure 3:
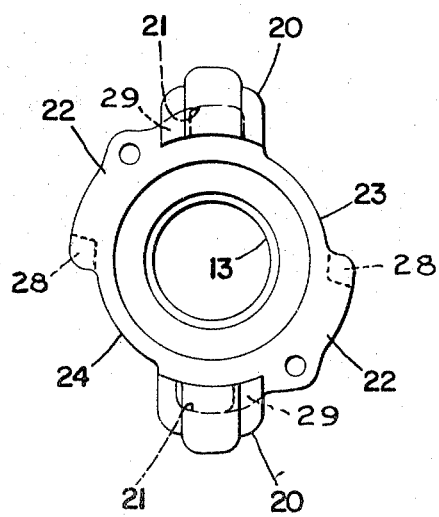
FIG. 3 is an end view of one of the coupling elements.

To assemble the coupling, bodies 12 are brought together with the circular portions 23, 24 of one body member circumferentially aligned with projections 20 of the other body member until the two gaskets 13 are in light line contact with each other, as shown in FIG. 1. The coupling elements 10, 11 are then forcibly pushed toward each other in axial connecting movement. This deforms the mass of the gaskets in the region of corner 37 to flatten out the frusto-conical faces 32 so that they engage in area contact rather than line contact. Also, the gasket material is deflected axially inward so that corners 43 move toward shoulders 26. When the coupling elements have been moved axially toward each other for a major portion of the axial connecting movement following initial contact of the gaskets with each other, the faces 32 will be in substantial area contact with each other and corners 43 will have deflected inwardly enough to engage shoulders 26 with line contact. During this first portion of the connecting movement the force for causing the same is less than would be the case if gasket corners 43 had been in initial contact with shoulders 26. Also, the frusto-conical shape of gasket faces 32 with the resulting gradual increase in mass deformation and area contact permits substantial axial connecting movement without causing the connecting force to become excessive. Further axial connecting movement additionally deforms the gasket material adjacent faces 32 so that these faces will be in greater area contact. Also, there is additional inward deflection of the gaskets whereby gasket material in the region of corners 43 deforms to make area contact with shoulders 26, as shown in FIG. 3. Such further deformation at corners 43 during the final portion of the connecting movement causes a greater increase in the resistance to axial connecting movement than would have otherwise occurred if corners 43 had remained out of contact with shoulders 26. This in turn causes an increase in the sealing pressure of the one gasket face 32 against the other gasket face 32 with proportionately less chance of leakage therebetween.

Although inner corners 43 of the gaskets contact shoulder 26 it is not contemplated that a fluid seal is to be accomplished in this location. On the contrary fluid under pressure within the coupling passages will force its way between shoulders 26 and the gaskets, particularly because the coupling elements 10, 11 are cast metal and shoulders 26 do not have a smooth surface finish, and will press axially on the gaskets to urge them into tight sealing engagement with flanges 25.

When the gasket outer faces press against each other during connecting travel the deformation of the gasket material in the region of corners 37 causes some of the material to flow radially inward. When the parts are coupled and subject to fluid pressure, the latter acts radially outwardly on the gasket material thus deformed causing the gasket outer faces 32 in this region to press tighter against each other, thus adding to the effectiveness of the fluid seal between faces 32.

Figure 2:
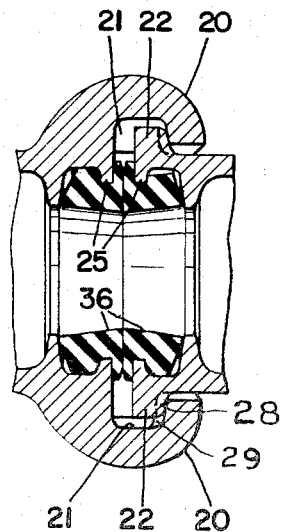
FIG. 2 is a fragmentary cross section view showing the coupling elements in their final assembled position.

Upon completion of the axial connecting movement of coupling elements 12, lugs 22 of each element will be axially opposite the recess 21 of the other element. The elements are then maually rotated relative to each other so that projections 28 on each flange 22 will enter the respective recess 21 and move past the respective projection 29. Now upon release of the manually applied axial connecting force the elements 12 will be moved apart slightly by the resistance of the gaskets to deflection and deformation to lock projections 28 behind projection 29 to prevent accidental uncoupling rotation of the elements relative to each other. The parts will then appear as in FIG. 2.

To uncouple, elements 12 are grasped manually and pushed toward each other to deform and deflect the gaskets slightly more than shown in FIG. 3 and to cause axial disengagement of projections 28 from projection 29. The elements may then be rotated relative to each other to withdraw lugs 22 from recesses 21 so that the elements are disconnected from each other and may be axially separated.

Because of the frusto-conical faces 32 and the avoidance of contact at the inner ends of the gaskets with shoulders 26 until near the end of the axial connecting movement there is substantial axial connecting travel of elements 12 without rapid and excessive increase of the manual connecting force. Moreover, with the additional resistance to connecting travel that is provided by contact of the gaskets with shoulders 26 occurring only near the end of the connecting travel, the increase in resistance to connecting travel that is afforded thereby operates to give greater assurance against leakage and accidental rotation and separation.

I claim:

1. A coupling element comprising a body and a gasket, the body having a flow passage therethrough and having means at one end thereof for attaching said body to another coupling element, and also having an internal flange at said one end, a recess axially inward of the flange having one end formed by the flange and its other end by a transverse shoulder spaced axially inwardly of said flange, the gasket being of deformable material with a bore therethrough and having a groove on its outer periphery that receives the flange for retaining the gasket to the body, both sides of said groove being in contact with said flange throughout substantially their entire radial length, the gasket having a frusto-conical outer end axially outward of said flange and having an inner end extending into said recess, the inner margin of said inner end being initially axially spaced from said shoulder, and said inner margin being deflectable into contact with said shoulder by swinging of the gasket about said flange upon pressure contact of said outer end with said another coupling element.

2. The coupling element of claim 1 in which the outer margin of said inner end is also axially spaced from said shoulder and remains out of contact therewith when the inner margin is deflected as aforesaid.

3. A coupling device comprising a pair of bodies each having a flow passage therethrough and each having a radially inturned flange at one of its ends and a transverse shoulder space axially inward of the respective flange, means on one body engageable with means on the other body for connecting the elements to each other with said ends facing each other, an annular gasket of deformable material having a groove in its outer periphery that has a radial depth less than one half of the radial thickness of the gasket and which receives said flange, each gasket having an opening therethrough communicating with the passage in the respective element, each gasket having an external frusto-conical axially outer portion engageable with the like outer portion of the other gasket when the elements are brought together for connection to each other, each gasket having an inner end whose radially inner margin is initially axially spaced from a respective one of said transverse shoulders, each gasket being deflectable axially toward the respective shoulder upon further axial connecting movement of said elements toward each other after initial engagement of said gasket axially outer portions, said initial engagement being radially inward of said flanges, said connecting means being engageable with each other upon a predetermined axial travel of one body toward the other after said initial engagement, and said inner margins being engageable with its respective shoulder by such deflection upon movement of the bodies for a substantial part of said predetermined travel.

4. The device of claim 3 in which said inner margins initially contact said respective shoulders in substantially line contact.

5. The device of claim 4 in which said the gasket material in the region of said inner margins deforms to establish area contact against the respective shoulder upon completion of said predetermined travel.

6. The device of claim 3 in which the contact pressure between said inner margins and said shoulders is insufficient for establishing a seal therebetween at high fluid pressures whereby fluid under high pressure within said flow passages flows between said shoulders and said gasket inner ends and acts axially on said inner ends to urge the gaskets into tight sealing engagement with said inturned flanges.

* * * * *